United States Patent
Yip et al.

(10) Patent No.: US 7,290,263 B1
(45) Date of Patent: Oct. 30, 2007

(54) METHOD AND SYSTEM FOR A SCRIPTABLE COMMAND LINE INTERFACE

(75) Inventors: Michael Yip, Sunnyvale, CA (US); Yeeping Chen Zhong, Milpitas, CA (US); Qi Cao, Diamond Bar, CA (US); Michael S. Polo, Cupertino, CA (US)

(73) Assignee: Extreme, Networks, Inc., Santa Clara, CA (US)

( * ) Notice: Subject to any disclaimer, the term of this patent is extended or adjusted under 35 U.S.C. 154(b) by 599 days.

(21) Appl. No.: 10/325,168

(22) Filed: Dec. 19, 2002

(51) Int. Cl.
- *G06F 3/00* (2006.01)
- *G06F 9/44* (2006.01)
- *G06F 9/46* (2006.01)
- *G06F 13/00* (2006.01)

(52) U.S. Cl. .................... 719/313; 717/121
(58) Field of Classification Search ............... 709/228; 719/329, 310–320; 717/120–121
See application file for complete search history.

(56) References Cited

U.S. PATENT DOCUMENTS

| | | | | |
|---|---|---|---|---|
| 5,991,814 A * | 11/1999 | Rzonca et al. | ............... | 709/237 |
| 6,091,412 A * | 7/2000 | Simonoff et al. | ........... | 715/749 |
| 6,668,368 B1 * | 12/2003 | Hernandez, III | ............ | 717/115 |
| 6,684,241 B1 * | 1/2004 | Sandick et al. | ............. | 709/220 |
| 6,907,572 B2 * | 6/2005 | Little et al. | ................. | 715/762 |
| 7,111,206 B1 * | 9/2006 | Shafer et al. | ................. | 714/48 |
| 2002/0147972 A1 * | 10/2002 | Olmeda et al. | ............. | 717/174 |
| 2002/0191619 A1 * | 12/2002 | Shafer | ........................ | 370/401 |
| 2003/0046370 A1 * | 3/2003 | Courtney | .................... | 709/220 |
| 2003/0051008 A1 * | 3/2003 | Gorthy et al. | .............. | 709/220 |
| 2003/0115304 A1 * | 6/2003 | Murray et al. | .............. | 709/222 |
| 2003/0163570 A1 * | 8/2003 | Hendley et al. | ............ | 709/227 |
| 2003/0167445 A1 * | 9/2003 | Su et al. | ..................... | 715/513 |
| 2004/0078374 A1 * | 4/2004 | Hamilton | ..................... | 707/10 |
| 2004/0103407 A1 * | 5/2004 | Blaukopf et al. | ........... | 717/140 |
| 2004/0216138 A1 * | 10/2004 | Pankovcin et al. | ......... | 719/320 |

OTHER PUBLICATIONS

Emmerich et al., Implementing incremental code migration with XML, Proceedings of the 22nd international conference on Software engineering pp. 397-406, Year of Publication: 2000.*
Crawford et al., A Unix command line argument processor, Southeastcon '88., IEEE Conference Proceedings Apr. 11-13, 1988 pp. 484-487.*
Shafer, XML-based Network Management, Juniper Networks, Inc, Aug. 2001, pp. 1-18.*
Vanaken, Writing CGI Scripts in Python, ACM, 1997, pp. 1-7.*

* cited by examiner

Primary Examiner—William Thomson
Assistant Examiner—Diem K Cao
(74) Attorney, Agent, or Firm—Blakely Sokoloff Taylor & Zafman, LLC

(57) ABSTRACT

A method and system for a scriptable command line interface is described. A script is written and associated with each command. When an input is received at a command line interface, the input is parsed to identify a command and any associated parameters. The script associated with the command is invoked, and parameters associated with the command are sent to an application to configure the application in accordance with the script. The application is executed and data is generated. The script receives the data from the application and formats the data for output.

10 Claims, 3 Drawing Sheets

METHOD AND SYSTEM FOR A SCRIPTABLE COMMAND LINE INTERFACE

BACKGROUND

1. Technical Field

Embodiments of the invention relate to the field of user interfaces, and more specifically to a scriptable command line interface.

2. Background Information and Description of Related Art

A typical command line interface (CLI) execution model begins with a user entering a command in a shell. The command is parsed by a CLI engine. One or more applications may then be invoked by the command. The invoked application will process the command and generate and format any data for output. This output is then displayed to the user. If a new format for the output is desired, a change to the application software code can be made, but the application software code must be then be recompiled. Therefore, the operation of the electronic computing device, such as a network device, must be interrupted for a period of time for even a minor change to the application software code, potentially causing much inconvenience to users and making it impractical to change output format.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for a scriptable command line interface are described. A script is written and associated with each command. When an input is received at a command line interface, the input is parsed to identify a command and any associated parameters. The script associated with the command is invoked, and parameters associated with the command are sent to an application to configure the application in accordance with the script. The application is executed and data is generated. The script receives the data from the application and formats the data for output.

Figure 1:
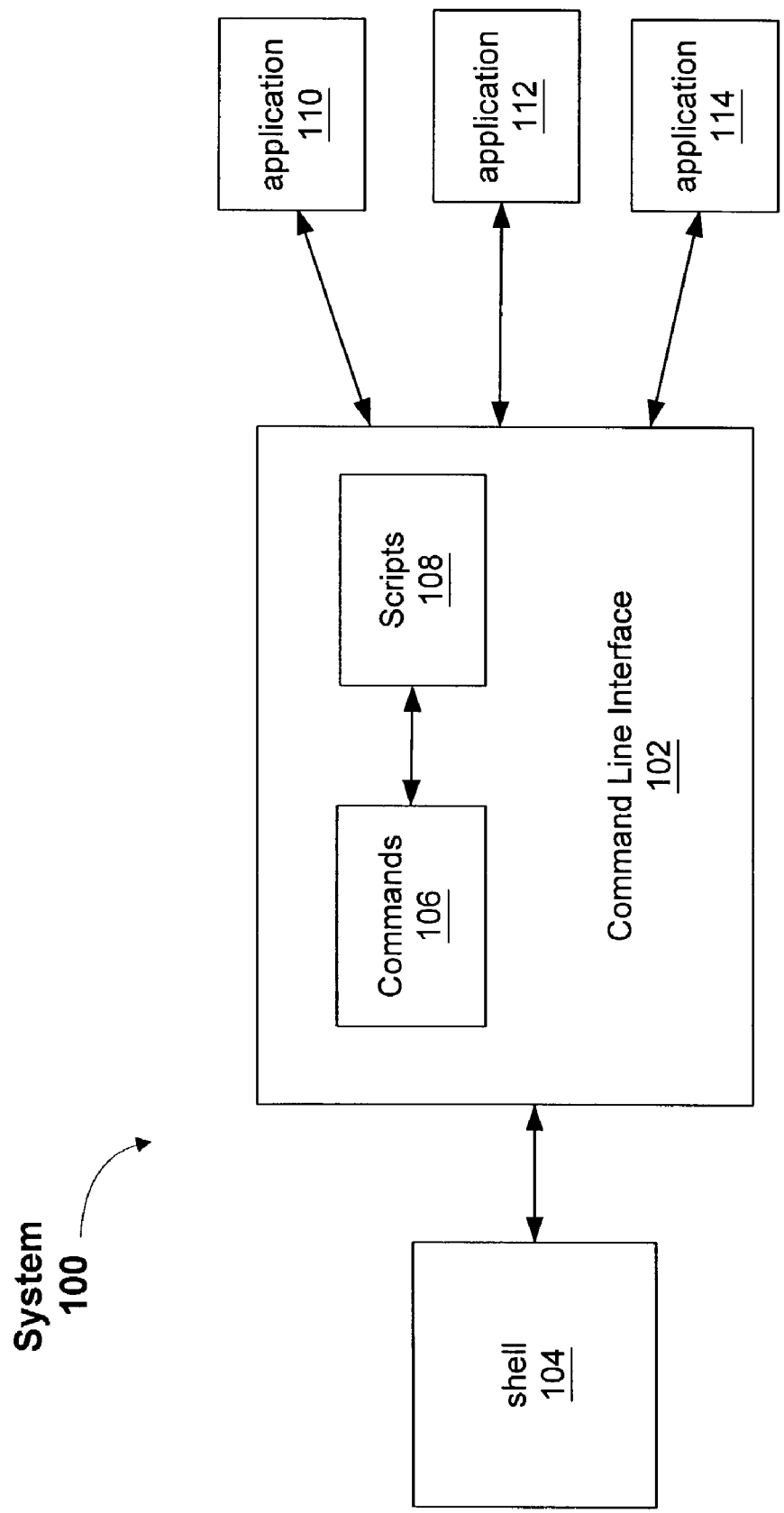
FIG. 1 is a block diagram of one generalized embodiment of a system incorporating the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention.

System 100 includes a shell 104 to receive commands input from a user and a command line interface 102 to parse the commands received from the shell. The command line interface 102 may invoke one or more applications, such as 110, 112, or 114, in response to the received commands.

The command line interface 102 includes a list of commands 106 and a plurality of scripts 108. Each script is associated with a command and is invoked when the associated command is received by the command line interface. The scripts 108 may be written in various scripting languages, such as TCL (Tool Command Language), PERL (Practical Extraction and Report Language), Python, Bourne Shell, or C Shell. In one embodiment, the scripts are written by a user. In response to a command entered in the shell, the script associated with the command sends parameters as input to an application. The parameters may include arguments entered by a user in the command line in conjunction with entering the command. The parameters may include other data used to configure the application according to user preference. In one embodiment, the parameters sent by the script as input to the application are encoded in XML (Extensible Markup Language).

The application receives the input from the script and processes the command and associated parameters. Data is then generated by the application. This data is typically encoded according to a scheme understood by the command line interface or the shell. For example, a binary or proprietary encoding scheme may be used to encode the data generated by the application. In one embodiment, XML is used to encode the data generated by the application. The script associated with the command receives the encoded data from the application and formats the data for output.

The script may be modified at any time to change the way the data received from the application is formatted for output. The script may also be modified to change the parameters sent to the application. By changing the scripts, it is unnecessary to edit and recompile the application for changes to output format.

As an example, suppose that a route manager application accepts and executes a command as follows:

show iproute <ip_address> <netmask> <gateway> <metric>

An example of a script written in TCL for the command above is as follows:

```
# Get command line arguments.
array set args $argv
# Build the XML configuration data.
set configuration \
<module_rtmgr><get><route><address>$args(<ip_ad-
    dress>) \
</address><netmask>$args(<netmask>)</
    netmask><gateway> \
$args(<gateway>)</gateway><metric>$args(<metric>)</
    metric> \
</route></get></module_rtmgr>
# Send the configuration data to application and receive reply.
set reply [getbulk $configuration 1]
# Parse XML reply and format display.
buildarray $reply-simple
if [string compare $xmlData(reply.status) "SUCCESS"] {
show "Destination IP: $reply.message.route.address\n"
show "Netmask: $reply.message.route.netmask\n"
show "Gateway: $reply.message.route.gateway\n"
show "Metric: $reply.message.route.metric\n"
} else {
show "Failed to add route!\n"
}
```

The getbulk, buildarray, and show commands are extended TCL commands that send parameters to the application to configure the application, receive data from the application, parse the received data, and display the output to a user.

Figure 2:
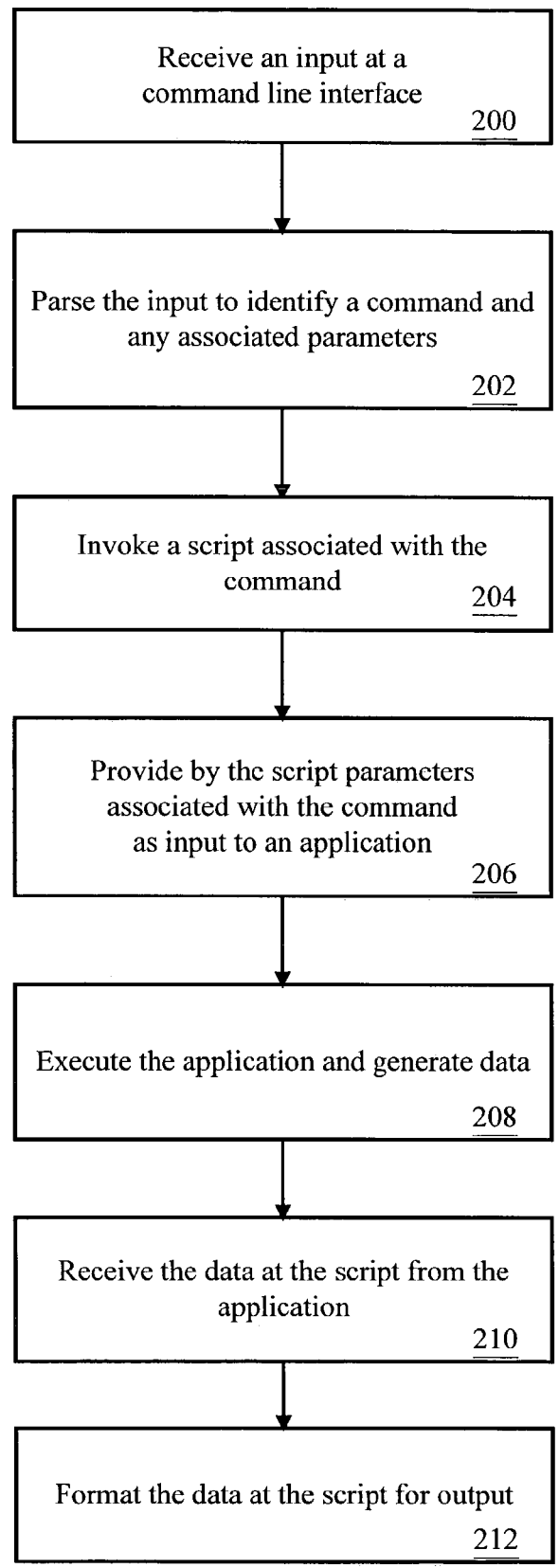
FIG. 2 is a flow diagram of a method according to an embodiment of the invention.

FIG. 2 is a flow diagram of a method according to an embodiment of the invention. At 200, an input is received at a command line interface. At 202, the input is parsed to identify a command and any associated parameters. At 204, a script associated with the command is invoked. At 206, parameters associated with the command are provided as input to an application based on the script. At 208, the application is executed and data is generated. At 210, the script receives the data from the application. At 212, the data is formatted by the script for output.

Figure 3:
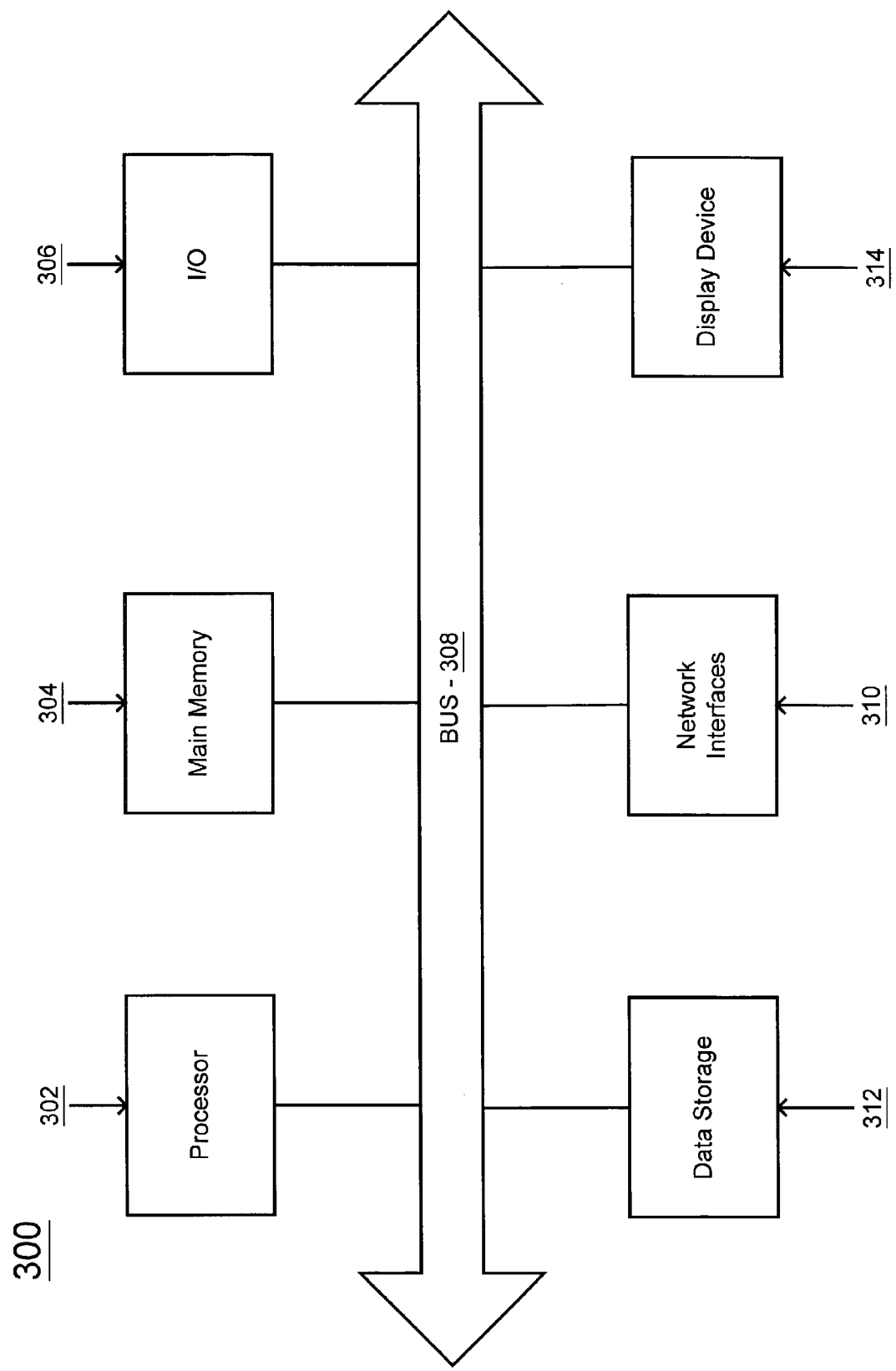
FIG. 3 is a block diagram illustrating a suitable computing environment in which certain aspects of the invention may be practiced.

FIG. 3 is a block diagram illustrating a suitable computing environment in which certain aspects of the invention may be practiced. A computer system 300 has components 302-314, including a processor 302, a memory 304, an Input/Output device 306, a data storage 312, a network interface 310, and a display device 314, coupled to each other via a bus 308. The components perform their conventional functions known in the art and provide means for implementing the system 100. For example, memory 304 may be used to store the scripts associated with the commands, while display device 314 may be used to display the data formatted for output. Collectively, these components represent a broad category of hardware systems, including but not limited to general purpose computer systems and specialized packet forwarding devices. It is to be appreciated that various components of computer system 300 may be rearranged, and that certain implementations of embodiments of the invention may not require nor include all of the above components. Furthermore, additional components may be included in system 300, such as additional processors (e.g., a digital signal processor), storage devices, memories, and network or communication interfaces.

As will be appreciated by those skilled in the art, a system incorporating an embodiment of the invention may be implemented in software, firmware, or hardware. The content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

In this description, numerous specific details have set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    receiving an input at a command line interface;
    parsing the input to identify a command and any associated parameters;
    invoking a script associated with the command;
    providing by the script parameters associated with command as input to a compiled application, the script parameters configuring the application in accordance with the script, but without a recompiling of the application, wherein the script parameters are Extensible Markup Language (XML) data;
    executing the application and generating data in response thereto;
    receiving the data at the script from the application;
    formatting the data at the script for output; and
    dynamically modifying the script to change the parameters provided by the script as input to the application.

2. The method of claim 1, wherein receiving data at the script from the application comprises receiving Extensible Markup Language (XML) data at the script from the application and wherein formatting the data at the script for output comprises formatting the XML data at the script for output.

3. The method of claim 1, wherein invoking a script associated with the command comprises invoking a script written in Tool Command Language (TCL) that is associated with the command.

4. The method of claim 1, wherein receiving an input at a command line interface comprises receiving input from a user at a command line interface and wherein invoking a script associated with the command comprises invoking a script written by the user that is associated with the command.

5. An article of manufacture comprising:
    a machine accessible medium including content that when accessed by a machine causes the machine to:
        receive a command at a command line interface;
        parse the command after receiving the command at the command line interface;
        invoke a script associated with the received command;
        send parameters associated with the received command to a compiled application to configure the application according to the script, but without a recompiling of the application, wherein send parameters associated with the received command to an application comprises send by the script Extensible Markup Language (XML) data to the application to configure the application;
        receive data at the script from the application;
        format the data at the script for output; and
        dynamically modify the script to change the parameters sent to the application.

6. The article of manufacture of claim 5, wherein a machine accessible medium including content that when accessed by a machine causes the machine to receive a command at a command line interface comprises a machine accessible medium including content that when accessed by a machine causes the machine to receive at a command line interface a command input by a user in a shell.

7. The article of manufacture of claim 6, wherein a machine accessible medium including content that when accessed by a machine causes the machine to invoke a script associated with the received command comprises a machine accessible medium comprising content that when accessed by a machine causes the machine to invoke a script written by the user that is associated with the command.

8. The article of manufacture of claim 6, further comprising a machine accessible medium including content that when accessed by a machine causes the machine to display the formatted data in the shell.

9. The article of manufacture of claim 5, wherein a machine accessible medium including content that when accessed by a machine causes the machine to receive data at the script from the application comprises a machine accessible medium comprising content that when accessed by a machine causes the machine to receive at the script from the application data written in Extensible Markup Language (XML).

10. The article of manufacture of claim 5, wherein a machine accessible medium including content that when accessed by a machine causes the machine to invoke a script associated with the received command comprises a machine accessible medium comprising content that when accessed by a machine causes the machine to invoke a script written in Tool Command Language (TCL) that is associated with the command.

* * * * *